(12) United States Patent
Nguyen et al.

(10) Patent No.: US 10,375,672 B2
(45) Date of Patent: *Aug. 6, 2019

(54) DATA BROADCASTING WITH A PREPARE-TO-BROADCAST MESSAGE

(71) Applicant: ITRON GLOBAL SARL, Liberty Lake, WA (US)

(72) Inventors: Viet-Hung Nguyen, Saint-Mande (FR); Jerome Bartier, Montrouge (FR); Fabrice Monier, Bry sur Marne (FR); Bastien Mainaud, Ris-Orangis (FR)

(73) Assignee: ITRON GLOBAL SARL, Liberty Lake, WA (US)

( * ) Notice: Subject to any disclaimer, the term of this patent is extended or adjusted under 35 U.S.C. 154(b) by 408 days.

This patent is subject to a terminal disclaimer.

(21) Appl. No.: 14/323,782

(22) Filed: Jul. 3, 2014

(65) Prior Publication Data

US 2014/0321384 A1 Oct. 30, 2014

Related U.S. Application Data

(63) Continuation of application No. 13/365,085, filed on Feb. 2, 2012, now Pat. No. 8,792,406, which is a
(Continued)

(30) Foreign Application Priority Data

Jan. 30, 2012 (EP) ..................................... 12153128

(51) Int. Cl.
*H04W 72/00* (2009.01)
*H04B 1/713* (2011.01)
*H04W 72/04* (2009.01)

(52) U.S. Cl.
CPC .......... *H04W 72/005* (2013.01); *H04B 1/713* (2013.01); *H04W 72/04* (2013.01); *H04W 72/0406* (2013.01)

(58) Field of Classification Search
CPC ............... H04W 72/005; H04W 72/04; H04W 72/0406; H04W 28/26; H04W 72/0453;
(Continued)

(56) References Cited

U.S. PATENT DOCUMENTS 6,349,210 B1    2/2002 Li
7,573,854 B2 *  8/2009 Heo ...................... H04L 1/0006
                                                  370/329
(Continued)

FOREIGN PATENT DOCUMENTS

EP         2384078       11/2011
JP      2005-080220 A     3/2005
(Continued)

OTHER PUBLICATIONS

Japanese Notice of Rejection dated Dec. 8, 2015, along with English translation, for Japanese Patent Application No. 2014-554705, 13 pages.
(Continued)

*Primary Examiner* — Hardikkumar D Patel

(57) ABSTRACT

Techniques for broadcasting data in a multi-channel network having a control channel and multiple data channels are described. A node wishing to broadcast data may determine a particular data channel from among the multiple data channels, a modulation technique, and a data rate to be utilized to broadcast the data. The broadcasting node may transmit a message over the control channel indicating that the data will be broadcast on the particular data channel using the modulation technique and at the determined data rate. The broadcasting node and a node wishing to receive the data may switch to the particular data channel. The broadcasting node may broadcast the data over the particular data channel, while the receiving node may receive the data. After broadcasting the data or a predetermined time period
(Continued)

has expired, the broadcasting node and receiving node may switch to the control channel.

20 Claims, 6 Drawing Sheets

Related U.S. Application Data continuation of application No. PCT/US2012/023337, filed on Jan. 31, 2012.

(58) Field of Classification Search
CPC ....... H04W 4/18; H04W 28/20; H04W 28/06; H04W 74/08; H04W 48/02; H04W 84/18; H04W 84/12; H04W 28/18; H04W 48/08; H04W 48/16; H04W 76/026; H04W 28/22; H04L 12/5695; H04L 47/14; H04L 47/15; H04L 47/2416; H04L 47/72; H04L 47/822; H04L 47/824; H04L 47/801; H04L 47/10; H04L 47/728; H04L 41/0668; H04L 43/0811; H04L 43/0852; H04L 43/0888; H04L 43/0882; H04L 5/0048; H04L 5/0023; H04L 5/0053; H04L 1/0006; H04L 1/0025; H04L 1/0029; H04L 1/0041; H04L 1/0068; H04L 1/0072; H04L 1/1812; H04L 27/0008; H04L 27/2601; H04B 1/713; H04B 7/0871; H04B 7/0413; H04B 1/406; H04B 7/086; H04B 7/0689; H03D 3/02; H04J 13/18

See application file for complete search history.

(56) References Cited

U.S. PATENT DOCUMENTS

| | | | |
|---|---|---|---|
| 7,948,911 B2 | 5/2011 | Larsson | |
| 8,170,052 B2 | 5/2012 | Orfanos et al. | |
| 9,025,518 B2 | 5/2015 | Lv et al. | |
| 2002/0093983 A1* | 7/2002 | Newberg | H04L 47/14 370/468 |
| 2002/0191544 A1 | 12/2002 | Cheng et al. | |
| 2003/0048199 A1* | 3/2003 | Zigdon | H04B 1/707 340/870.02 |
| 2003/0156599 A1 | 8/2003 | Casaccia et al. | |
| 2003/0224774 A1 | 12/2003 | Cheng et al. | |
| 2005/0243782 A1* | 11/2005 | Sakoda | H04L 47/10 370/338 |
| 2007/0201401 A1 | 8/2007 | Benveniste | |
| 2007/0280262 A1* | 12/2007 | Larsen | H04W 88/04 370/395.21 |
| 2008/0084835 A1 | 4/2008 | Goel et al. | |
| 2008/0089390 A1 | 4/2008 | Picard | |
| 2008/0144493 A1* | 6/2008 | Yeh | H04W 52/50 370/230 |
| 2008/0144500 A1 | 6/2008 | Chen et al. | |
| 2008/0165697 A1 | 7/2008 | Zeira et al. | |
| 2008/0232294 A1 | 9/2008 | Ulupinar et al. | |
| 2008/0238714 A1 | 10/2008 | Ehrke et al. | |
| 2009/0147717 A1 | 6/2009 | Cai | |
| 2009/0252104 A1 | 10/2009 | Zhang et al. | |
| 2010/0110920 A1 | 5/2010 | Liu et al. | |
| 2010/0232369 A1 | 9/2010 | Jing et al. | |
| 2010/0265909 A1* | 10/2010 | Petite | H04B 1/406 370/329 |
| 2011/0158110 A1 | 6/2011 | Stacey et al. | |
| 2013/0142035 A1* | 6/2013 | Sunderrajan | H04L 41/0668 370/225 |

FOREIGN PATENT DOCUMENTS

| | | |
|---|---|---|
| JP | 2007096933 A | 4/2007 |
| JP | 2008-061037 A | 3/2008 |
| JP | 2008-518543 A | 5/2008 |
| JP | 2009-515419 A | 4/2009 |
| JP | 2012-050089 A | 3/2012 |
| KR | 20110039186 | 4/2011 |
| WO | 2007097738 A2 | 8/2007 |
| WO | 2011078950 A2 | 6/2011 |

OTHER PUBLICATIONS

Yosuke Tanigawa, et al., "Multi-Channel MAC Protocols Pursuing Aggressive Use of Vacant Resources," The IEICE Transactions on Communications (Japanese Edition), J92-B, No. 1, The Institute of Electronics, Information and Communication Engineers, Japan, English abstract attached, Jan. 1, 2009, 18 pages.
The Australian Office Action dated Apr. 14, 2015 for Australian patent application No. 2012368308, a counterpart foreign application of U.S. Pat. No. 8,792,406, 3 pages.
The Extended European Search Report dated Feb. 2, 2015 for European patent application No. 14186014.8, 7 pages.
The Extended European Search Report dated Jun. 26, 2012 for European patent application No. 12153128.9, 6 pages.
Freaklabs—Open Source Wireless, IEEE 802.15.4 in the context of Zigbee—Part 2, Dec. 14, 2008, 8 pages.
Office action for U.S. Appl. No. 13/365,085, dated Oct. 2, 2013, Nguyen et al., "Data Broadcasting With a Prepare-to-Broadcast Message", 15 pages.
The PCT Search Report dated Feb. 13, 2013 for PCT application No. PCT/US12/23337, 9 pages.
Wireless Medium Access Control, IEEE 802.15.4, Speaker Chun-Yi Chen, Sep. 7, 2007, 40 pages.
Australian Office Action dated Oct. 14, 2016, for Australian Patent Application No. 2015268603, 4 pages.
Notice of Allowance dated Jun. 21, 2016, for Japanese Patent Application No. 2014-554705, 6 pages.
Notice of Acceptance dated Sep. 17, 2015, for Australian Patent Application No. 2012368308, 2 pages.
Canadian Office Action dated Nov. 30, 2016, for Canadian Patent Application No. 2,863,298, 4 pages.
Australian Office Action dated Oct. 5, 2017, for Australian Patent Application No. 2015268603, 4 pages.
Japanese Office Action dated Oct. 31, 2017, for Japanese Patent Application No. 2016-143487, English abstract included, 10 pages.
Notice of Rejection dated May 15, 2018, with English-language translation, for Japanese Patent Application No. 2016-143487, 12 pages.
Office Action dated May 23, 2018, for Canadian Patent Application No. 2,863,298, 4 pages.
Notice of Allowance dated Aug. 7, 2018, with English-language translation, for Japanese Patent Application No. 2016-143487, 6 pages.
Australian Office Action dated Nov. 30, 2018, for Australian Patent Application No. 2017245446, 2 pages.
Notice of Acceptance dated Jan. 7, 2019, for Australian Patent Application No. 2017245446, 3 pages.

* cited by examiner

US 10,375,672 B2

DATA BROADCASTING WITH A PREPARE-TO-BROADCAST MESSAGE

RELATED APPLICATIONS

This application claims priority to and is a continuation of U.S. patent application Ser. No. 13/365,085, filed on Feb. 2, 2012, which is a continuation of, and claims priority to, PCT International Application No. PCT/US12/23337, filed Jan. 31, 2012, which claims foreign priority to European Application No. 12153128.9, filed on Jan. 30, 2012. The entire contents of all of these applications are incorporated herein by reference.

BACKGROUND

Communication networks, such as wireless mesh networks, are used to connect a variety of different devices (e.g., nodes). These communication networks often contain multiple different generations of nodes having different characteristics and capabilities.

Within a communication network, one or more nodes may wish to communicate while a particular node is broadcasting data. Due to a limited number of channels and/or in order to avoid interference, the one or more nodes may be forced to communicate after the particular node finishes broadcasting the data. This waiting period may be lengthened when the particular node broadcasts a large amount of data which requires more communication time. In addition, this waiting period may be lengthened when the particular node broadcasts the data based on a particular modulation technique and/or data rate that requires more communication time.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
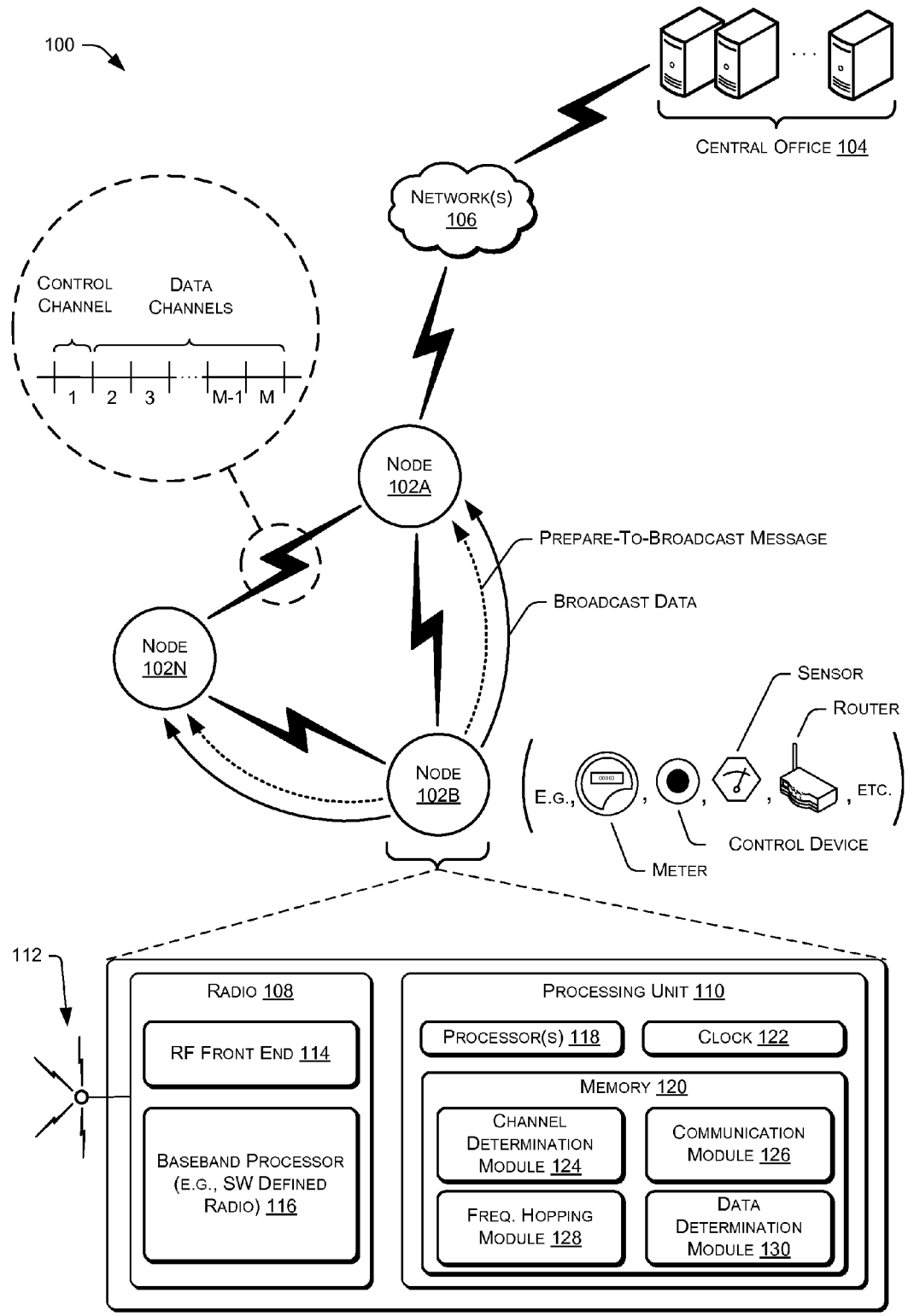
FIG. 1 is a schematic diagram of an example architecture of a multi-channel, wireless mesh network in which data can be broadcast among nodes.

As discussed above, existing techniques for broadcasting data do not provide an effective way of broadcasting data within a wireless mesh network. For example, existing broadcasting techniques are not well suited to broadcast data in a heterogeneous wireless mesh network in which nodes have differing capabilities.

This disclosure describes techniques directed to broadcasting data in an efficient manner to one or more nodes of a network. The disclosure introduces a prepare-to-broadcast (PTB) message, to be sent over a control channel to the one or more neighboring nodes. The network may comprise a multi-channel network having a control channel and multiple data channels. In some implementations, a node wishing to broadcast data (e.g., a broadcasting node) may determine a particular data channel of the multiple data channels to be utilized to broadcast data, a particular modulation technique to be utilized, and/or a particular data rate to be utilized. In some instances, the determination is based at least in part on the capabilities of one or more other nodes (e.g., neighboring nodes) within a predetermined proximity to the broadcasting node.

The broadcasting node may transmit a prepare-to-broadcast (PTB) message over the control channel to the one or more neighboring nodes that are listening on the control channel. As used herein, the term "PTB message" may generally refer to a message that is transmitted before data is broadcast indicating that a node (e.g., the broadcasting node) wishes to broadcast data. The PTB message may also indicate a particular data channel to be utilized to broadcast the data, a modulation technique to be utilized, and/or a data rate (e.g., bit rate) to be utilized. The PTB message may also include information to identify the data that will be broadcast (e.g., a data identifier (ID)). The particular data channel, modulation technique, and/or data rate indicated in the PTB message may comprise a particular data channel, modulation technique, and/or data rate previously determined by the broadcasting node. In some instances, the PTB message is shorter in length than the data. That is, the PTB message includes less bits and/or bytes than the data.

After the PTB message has been transmitted on the control channel, the broadcasting node and/or the one or more neighboring nodes may switch (e.g., tune, with an RF-receiving radio) to the particular data channel. The broadcasting node may broadcast the data over the particular data channel based at least in part on the modulation technique and/or data rate indicated in the PTB message. Meanwhile, the one or more neighboring nodes may receive the data over the particular data channel. The broadcasting node and/or the one or more neighboring nodes may switch to the control channel after the data has been broadcast and/or a predetermined time period has expired since switching to the particular data channel.

Use of the PTB message may allow broadcast of data without receiving any communication from one or more neighboring nodes. For example, a broadcasting node may broadcast the data without knowing whether the one or more neighboring nodes are available to receive the broadcast. Thus, the data may be broadcast without exchanging a request-to-send (RTS) message and/or a clear-to-send (CTS) message between the broadcasting node and the one or more neighboring nodes. Additionally, or alternatively, after the data has been broadcast, the broadcasting node may switch back to the control channel without receiving an acknowledgement message from the one or more neighboring nodes indicating that the data was received.

The broadcasting techniques are described herein in the context of a utility mesh network including a plurality of nodes. While the techniques are described in the context of a utility mesh network, the techniques may additionally, or alternatively, be applicable to other networks and/or other applications. As such, the nodes may include any device coupled to a communication network and capable of sending and/or receiving data.

In various embodiments described herein, data may be broadcast in an efficient manner. For example, by employing a multi-channel network having a control channel and multiple data channels, a node may communicate over the control channel while another node broadcasts data over a data channel. In addition, by utilizing multiple data channels, a first node may broadcast data over a first data channel while a second node broadcasts, or otherwise communicates, over a second data channel. This may allow a network to increase data throughput compared to techniques which utilize a single channel. Further, by communicating shorter messages on a control channel and broadcasting longer data (e.g., data frames) on a data channel, more nodes may communicate over the control channel compared to techniques which utilize a single channel for communicating short messages and long data.

In addition, in some instances, by broadcasting data with a modulation technique and/or data rate that is determined based at least in part on capabilities of one or more nodes neighboring a broadcasting node, the capabilities of the one or more neighboring nodes may be leveraged to decrease a time required to broadcast the data. That is, the data may be broadcast with a modulation technique and/or data rate that requires less communication time from among modulation techniques and/or data rates that are available to the one or more neighboring nodes or that might otherwise be utilized to broadcast the data.

The sections below are examples provided for the reader's convenience and are not intended to limit the scope of the claims, nor the proceeding sections. Furthermore, the techniques described in detail below may be implemented in a number of ways and in a number of contexts. One example implementation and context is provided with reference to the following figures, as described below in more detail. Additionally, the following implementation and context is meant to be representative of other possible implementations.

Example Architecture

FIG. 1 is a schematic diagram of an example architecture 100 of a multi-channel, wireless mesh network in which a PTB message and/or data can be broadcast. The architecture 100 includes a plurality of nodes 102A, 102B, . . . 102N (collectively referred to as nodes 102) communicatively coupled to each other via direct communication paths. In this example, N represents a number of nodes in an autonomous routing area (ARA), such as a wide area network (WAN), metropolitan area network (MAN), local area network (LAN), neighborhood area network (NAN), personal area network (PAN), or the like.

Each direct communication path may represent a plurality of channels over which a node is able to transmit and/or receive a PTB message and/or data. Each of the plurality of channels may be defined by a frequency range which may be the same as or different from frequency ranges of others of the plurality of channels. In some instances, the plurality of channels comprises radio frequency (RF) channels. The plurality of channels may comprise a control channel and multiple data channels. In some instances, the control channel is utilized for communicating one or more PTB messages to nodes to specify one of the multiple data channels, a modulation technique, and/or a data rate to be utilized to broadcast data. Meanwhile, the data channels may be utilized for communicating data. Generally, transmissions on the control channel are shorter relative to transmissions on the data channels.

Each of the nodes 102 may be implemented as any of a variety of conventional computing devices such as, for example, smart utility meters (e.g., electric, gas, and/or water meters), control devices, sensors (e.g., temperature sensors, weather stations, frequency sensors, etc.), transformers, routers, servers, relays (e.g., cellular relays), switches, valves, combinations of the foregoing, or any device couplable to a communication network and capable of sending and/or receiving data. In some cases, the nodes 102 may include different types of nodes (e.g., smart meters, cellular relays, sensors, etc.), different generations or models of nodes, and/or nodes that otherwise are capable of transmitting on different channels and using different modulation techniques, data rates, protocols, signal strengths, and/or power levels. In these cases, the architecture 100 may represent a heterogeneous network of nodes.

In the example of FIG. 1, the nodes 102 are also configured to communicate with a central office 104 via an edge device (e.g., cellular relay, cellular router, edge router, DODAG root, etc.) which serves as a connection point of the ARA to a backhaul network(s) 106, such as the Internet. In the example illustrated, the node 102A serves as a cellular relay to relay communications from the other nodes 102B-102N of the ARA to and from the central office 104 via the network(s) 106.

The node 102B is representative of each of the nodes 102 and includes a radio 108 and a processing unit 110. The radio 108 comprises an RF transceiver configured to transmit and/or receive RF signals via one or more of a plurality of channels/frequencies. In some implementations, each of the nodes 102 includes a single radio 108 configured to send and receive data on multiple different channels, such as the control channel and multiple data channels of each communication path. The radio 108 may also be configured to implement a plurality of different modulation techniques, data rates, protocols, signal strengths, and/or power levels.

In some implementations, the radio 108 utilizes a modulation technique and/or data rate associated with a previously defined standard. The modulation technique and/or data rate may be associated with a standard defined by the Institute of Electrical and Electronics Engineering (IEEE), such as the IEEE 802.11 standard, the IEEE 802.15 standard (e.g., 802.15.4), etc. In one example, the modulation technique and/or data rate are selected from the following non-exhaustive list:

Frequency Shift Keying (FSK) modulation with a data rate of 50 or 150 kbps; channel spacing of 200 or 400 kHz; and/or a first channel starting at 902.2 or 902.4 MHz. FSK modulation may utilize convolutional code forward error correction (FEC).

Orthogonal Frequency-Division Multiplexing (OFDM) with physical modulations of binary phase-shift keying (BPSK), quadrature phase-shift keying (QPSK), and/or quadrature amplitude modulation (QAM) (e.g., 16-QAM); a data rate of 50, 100, 200, 300, 400, 600, or 800 kbps; and/or channel spacing of 400 or 800 kHz. OFDM may utilize convolutional FEC with ½ or ¾ coding rate.

Direct-sequence spread spectrum (DSSS) modulation with a physical modulation of offset quadrature phase-shift keying (O-QPSK); a data rate of 31.25, 125, 250, or 500 kbps; and/or channel design based on a previously defined standard, such as the 802.15.4 standard. DSSS may utilize convolutional FEC.

In further examples, the radio 108 may utilize a customized modulation technique. The customized modulation technique may be associated with a data rate of 6 or 10 kbps.

In the example of FIG. 1, the radio 108 includes an antenna 112 coupled to an RF front end 114 and a base baseband processor 116. The RF front end 114 may provide transmitting and/or receiving functions. The RF front end 114 may include high-frequency analog and/or hardware components that provide functionality, such as tuning and/or attenuating signals provided by the antenna 112 and obtained from one or more of the nodes 102. The RF front end 114 may provide a signal to the baseband processor 116.

In one implementation, all or part of the baseband processor 116 may be configured as a software (SW) defined radio. In one example, the baseband processor 116 provides frequency and/or channel selection functionality to the radio 108. For example, the SW defined radio may include mixers, filters, amplifiers, modulators and/or demodulators, detectors, etc., implemented in software executed by a processor or application specific integrated circuit (ASIC) or other embedded computing device(s). The SW defined radio may utilize processor(s) 118 and software defined or stored in memory 120. Alternatively, the baseband processor 116 may be implemented at least in part using analog components.

The processing unit 110 may include one or more processor(s) 118 communicatively coupled to memory 120. The processing unit 110 may also include a clock 122 configured to provide a clock signal and/or maintain a time. In one example, the clock signal is provided as an input to the processor 118. The clock 122 may also be configured to provide one or more count-up or count-down timers. Such timers may be used in frequency hopping among multiple communication channels.

The memory 120 may be configured to store one or more software and/or firmware modules, which are executable on the processor(s) 118 to implement various functions. While the modules are described herein as being software and/or firmware executable on a processor, in other embodiments, any or all of the modules may be implemented in whole or in part by hardware (e.g., as an ASIC, a specialized processing unit, etc.) to execute the described functions.

In the embodiment of FIG. 1, the memory 120 includes a channel determination module 124, a communication module 126, a frequency hopping module 128, and a data determination module 130. The channel determination module 124 may determine a particular data channel from among multiple data channels to be utilized to broadcast data, a modulation technique to be utilized, and/or a data rate to be utilized. The particular data channel, modulation technique, and/or data rate may be output to the communication module 126. In some instances, the channel determination module 124 maintains a location (e.g., frequency or frequency range) of a control channel and/or the multiple data channels. Additionally, or alternatively, the channel determination module 124 may maintain a list of available data channels from among the multiple data channels.

The communication module 126 may cause switching of a communication channel utilized by the node 102 for communication. For example, the communication module 126 may cause the node 102 to switch from a control channel to a data channel and/or from a data channel to a control channel. That is, the communication module 126 may cause the radio 108 of the node 102 to tune from a frequency associated with a control channel to a frequency associated with a data channel. In addition, the communication module 126 may cause one or more PTB messages and/or data to be transmitted and/or received on a communication channel (e.g., control channel, data channel). The particular data channel, modulation technique, and/or data rate indicated in the PTB message may comprise a particular data channel, modulation technique, and/or data rate input to the communication module 126 from the channel determination module 124.

The frequency hopping module 128 may be configured to communicate with the baseband processor 116 and the clock 122. In one example, the frequency hopping module 128 is configured to obtain time information and/or set frequency-hopping timers in the clock 122. Such time information and/or timers will indicate to the frequency hopping module 128 when to "hop" or tune to a different channel or frequency. Additionally, the frequency hopping module 128 may be configured to direct the SW defined radio or other component of the radio 108 to perform the actual frequency changes. Accordingly, the frequency hopping module 128 is able to repeatedly shift between agreed upon frequencies, at agreed upon times and communicate with another node(s) for agreed upon periods of time and in agreed upon protocols.

The data determination module 130 may determine whether data to be broadcast has already been received. The determination may be based at least in part on a data ID included in a PTB message of the data that will be broadcast. The data determination module 130 may compare this data ID with data IDs associated with other data (e.g., data packets) that have been previously received.

In some implementations (e.g., when the node is a utility meter), the memory 120 may also include a metrology module configured to collect consumption data of one or more resources (e.g., electricity, water, natural gas, etc.), which may then be transmitted to one or more other nodes 102 for eventual propagation to the central office 104 or another destination.

The memory 120 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The network(s) 106, meanwhile, represents a backhaul network, which may itself comprise a wireless or a wired network, or a combination thereof The network(s) 106 may be a collection of individual networks interconnected with each other and functioning as a single large network (e.g., the Internet or an intranet). Further, the individual networks may be wireless or wired networks, or a combination thereof The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office 104 may be distributed amongst multiple locations and/or may be eliminated entirely (e.g., in the case of a highly decentralized distributed computing platform).

Figure 2:
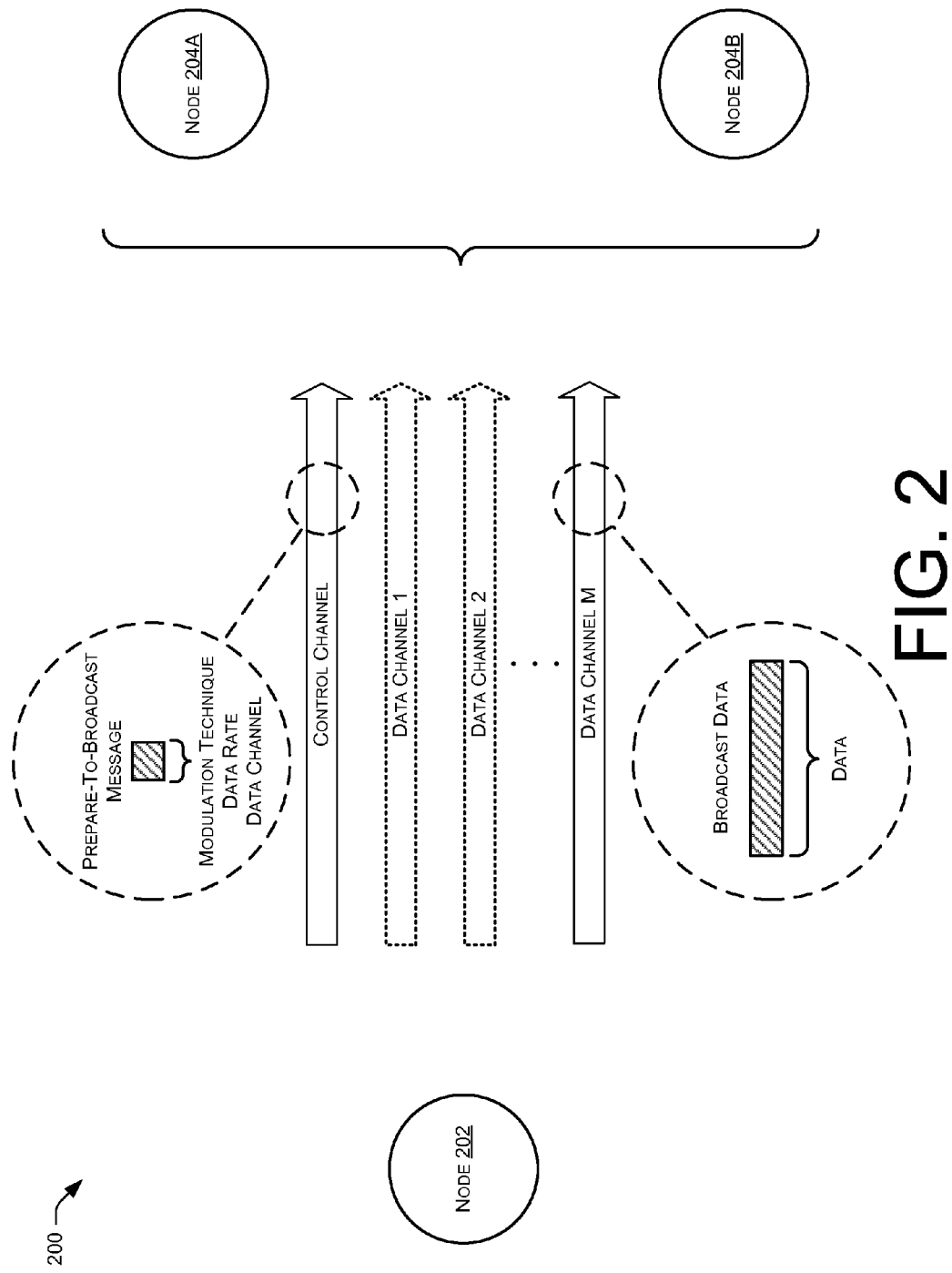
FIG. 2 illustrates an example environment for broadcasting data from a broadcasting node to one or more neighboring nodes.

FIG. 2 illustrates an example environment 200 for broadcasting data from a broadcasting node 202 to one or more neighboring nodes 204A and 204B. The nodes 202-204 may be similar to or the same as the nodes 102 in FIG. 1. The neighboring nodes 204A and 204B may be located within a predetermined proximity to the broadcasting node 202 such that the broadcasting node 202 may communicate with the neighboring nodes 204A and 204B. Although the following description refers to the node 202 as a broadcasting node and the nodes 204A and 204B as nodes that receive the broadcast data, it should be understood that many nodes can function as both a broadcasting node and a receiving node as needed.

In some instances, the broadcasting techniques described below refer to various layers of the nodes 202, 204A, and 204B that may be based at least in part on the Open Systems Interconnection (OSI) Model or the like. In the OSI Model, the nodes 202, 204A, and 204B may each include a plurality of layers, such as a Physical Layer, a Data Link Layer, and one or more additional layers. In particular implementations, the Data Link Layer includes a Media Access Control (MAC) sub-layer implementing various functionality. Although the following description refers to specific layers for implementing various functionality, it should be appreciated that the functionality described below may be otherwise implemented by the nodes 202, 204A, and 204B.

In the example of FIG. 2, a MAC sub-layer of the broadcasting node 202 may receive a command from another layer of the broadcasting node 202 requesting to broadcast data. The command may be received from an upper layer of the broadcasting node 202, that is, a layer that is further removed from a physical layer of the broadcasting node 202 than the MAC sub-layer. In some embodiments, the command may request that the data be broadcast with a specific modulation technique and/or at a data rate. While in other embodiments, the command merely requests that the data be broadcast.

After receiving the command, the MAC sub-layer of the broadcasting node 202 may determine a particular data channel from among multiple data channels. The determination may be based at least in part on a list of available data channels that are currently available for communication. The list of available data channels may be maintained in memory of a node (e.g., node 202, 204A, and/or 204B) and may be updated based at least in part on communications received from one or more other nodes indicating that a channel may be busy (e.g., utilized for communication) for a period of time. In FIG. 2, the data channel M represents the data channel that is determined for broadcasting the data. In the architecture 100 of FIG. 1, the determination of the particular data channel may be performed by the channel determination module 124.

The broadcasting node 202 may additionally, or alternatively, determine a particular modulation technique and/or data rate to be utilized for broadcasting the data. When a modulation technique and/or data rate are specified in a command received from an upper layer of the broadcasting node 202, the specified modulation technique and/or data rate are selected for broadcasting the data. However, when a modulation technique and/or data rate are not specified in the command, then the MAC sub-layer of the broadcasting node 202 may determine a modulation technique and/or data rate to be utilized for broadcasting the data. The determination may be based at least in part on capabilities of the nodes 202, 204A, and/or 204B.

As noted above, the nodes 202, 204A, and/or 204B may comprise different generations and/or types of nodes, such as smart utility meters, sensors, control devices, transformers, routers, servers, relays, switches, valves, or a combination thereof In this case, the nodes 202, 204A, and/or 204B may employ or be capable of employing different modulation techniques and/or data rates. Such capabilities (e.g., modulation techniques, data rates, etc.) may be determined based on, for example, a previous communication from one or more of the nodes 202, 204A, and/or 204B, other nodes, a central office, and/or other devices.

Accordingly, in some instances, the broadcasting node 202 may leverage these capabilities by determining a modulation technique and/or data rate that is common to the nodes 202, 204A, and/or 204B from among a plurality of modulation techniques and/or data rates that are available. The broadcasting node 202 may determine a modulation technique and/or data rate that provides a longest communication range, provides a maximum data rate, and/or is less susceptible to interference from among modulation techniques and/or data rates that are available and/or common to the nodes 202, 204A, and/or 204B.

After determining the particular data channel, modulation technique, and/or data rate, the broadcasting node 202 may transmit (e.g., an RF broadcast) a PTB message on a control channel. As noted above, the PTB message may indicate the particular data channel, modulation technique, and/or data rate determined to be utilized to broadcast the data. In addition, the PTB message may include a data ID identifying the data to be broadcast.

The PTB message may be transmitted to one or more neighboring nodes that are listening on the control channel (e.g., the nodes 204A and/or 204B). In some examples, the PTB message is transmitted with the same modulation technique and/or at the same data rate that will be utilized for broadcasting the data. Furthermore, in some examples, the PTB message is transmitted by utilizing an access method, such as the carrier sense multiple access with collision avoidance (CSMA/CA) method. In the example architecture 100 of FIG. 1, the communication module 126 may cause the PTB message to be transmitted.

In some implementations, the PTB message is transmitted when the PTB message is shorter in length than the data to be broadcast. That is, the PTB message may be transmitted if it includes fewer bits and/or bytes than the data. In such circumstances, a broadcasting node may confirm that the PTB message is shorter in length before transmitting the PTB message. If a number of bits or bytes of the data is greater than or equal to a number of bits or bytes of the PTB message, then the broadcasting node may proceed to transmit the PTB message. When the PTB message is not shorter in length than the data, then the data may be directly transmitted on a control channel and/or data channel without transmitting a PTB message.

Meanwhile, the one or more neighboring nodes listening on the control channel (e.g., the nodes 204A and/or 204B) may receive the PTB message and determine whether the data has been previously received. In some instances, the one or more neighboring nodes each include a list of data IDs corresponding to data (e.g., data packets) that have been previously received by the node. The list of data IDs may be included in a table. Here, the one or more neighboring nodes may each compare a data ID provided in the PTB message with the list of data IDs. When the comparison indicates that the data ID of the PTB message is not included in the list, then the one or more neighboring nodes may determine that the data to be broadcast has not been previously received. In the architecture 100 of FIG. 1, the data determination module 130 may determine whether data has been previously received.

When the data has not been previously received, the one or more neighboring nodes may switch to the particular data channel and begin listening for the data. When the data has been previously received, the one or more neighboring nodes may continue listening on the control channel for other messages. In the architecture 100 of FIG. 1, the communication module 126 may cause the radio 108 to tune the particular data channel.

The broadcasting node 202 may switch to the particular data channel after transmitting the PTB message. The broadcasting node 202 may then begin broadcasting (e.g., transmitting) the data over the particular data channel based at least in part on the modulation technique and/or data rate previously determined for broadcasting the data. In some instances, the data is broadcast after a predetermined time interval has expired since the PTB message was transmitted. The predetermined time interval may comprise a Short Inter-Frame Space (SIFS) defined by, for example, the IEEE 802.11 and/or 802.15 standard. After the data has been broadcast, the broadcasting node 202 may switch back to the control channel. In the architecture 100 of FIG. 1, the communication module 126 may cause switching (i.e., a change in a tuned frequency) to and from the particular data channel and cause the data to be broadcast.

The one or more neighboring nodes (e.g., the nodes 204A and/or 204B) may listen on the particular data channel for the data. In some instances, the one or more neighboring nodes may each receive the data over the particular data channel by utilizing the modulation technique and/or data rate specified in the PTB message. The one or more neighboring nodes may each switch back to the control channel after the data has been received. In other instances, the one or more neighboring nodes may not receive the data after a predetermined time period has expired (e.g., a timeout period), and may switch back to the control channel after the predetermined time period has expired.

As noted above, in some instances, the data is broadcast without receiving any communication from one or more neighboring nodes. For example, the broadcasting node 202 may broadcast the data without knowing whether the one or more neighboring nodes are available to receive the broadcast. That is, the data may be broadcast without exchanging a request-to-send (RTS) message and/or a clear-to-send (CTS) message between the broadcasting node 202 and the one or more neighboring nodes. Additionally, or alternatively, after the data has been broadcast, the broadcasting node 202 may switch back to the control channel without receiving an acknowledgement message from the one or more neighboring nodes indicating that the data was received. The RTS, CTS, and/or acknowledgement messages may be defined in part by a standard, such as the IEEE 802.11 and/or IEEE 802.15 standard.

In some implementations, the data broadcasting process is repeated a number of times. That is, the PTB message is retransmitted a number of times and the data is rebroadcast after each retransmission of the PTB message. The number of times may be specified by a layer, such as a MAC sub-layer or an upper layer of a node (e.g., a layer above the MAC sub-layer). In instances where the upper layer specifies the number of times to rebroadcast the data, this number may take priority over a number determined and/or specified by the MAC sub-layer. This rebroadcasting process may provide another opportunity for one or more neighboring nodes to receive the PTB message and/or the data, which may not have been received due to, for example, interference and/or a communication that involved the one or more neighboring nodes while the PTB message and/or data was previously transmitted.

Example Broadcasting with Frequency Hopping

Figure 3:
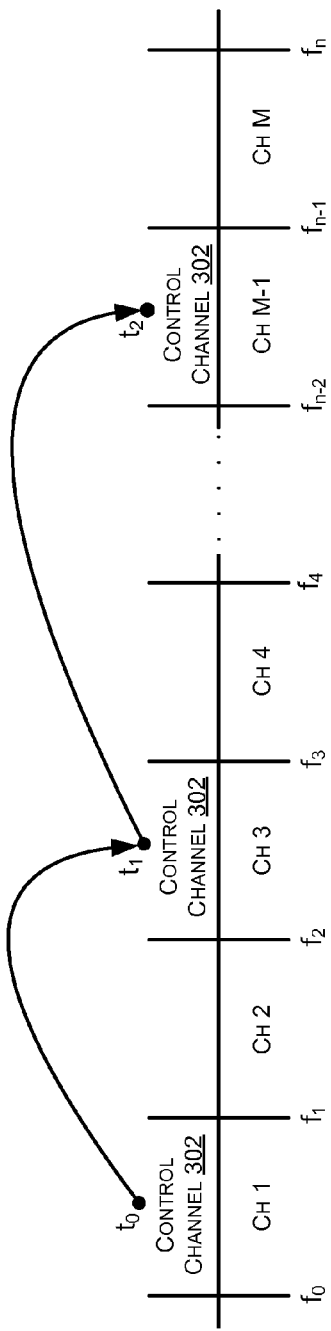
FIG. 3 illustrates an example frequency hopping process which may be utilized in broadcasting data in a multi-channel network.

FIG. 3 illustrates an example frequency hopping process 300 which may be utilized in broadcasting data in a multi-channel network. Frequency hopping generally includes the sequential tuning, by one or more nodes, of one or more channels (e.g., a control channel and/or data channel(s)) as a function of time. Moreover, a control channel may be repeatedly redefining from a first channel (e.g., first RF frequency range) at a particular time to a second channel (e.g., second RF frequency range) at a different time, and so on. Because the timing of the hopping is synchronized, nodes are able to move between channels in a harmonized manner—e.g., tuning a same data channel at a same time, transmitting/receiving data for a same period of time, and then tuning a same control channel frequency at the same time, etc.

To illustrate, in FIG. 3 a control channel 302 is redefined as a function of time such that the control channel 302 is located at a channel 1 at a time $t_0$, at a channel 3 at a time $t_1$, and at a channel M-1 at a time $t_2$. When the control channel 302 is located at a particular channel, then the other channels may comprise data channels. As illustrated, each of the channels 1-M is defined by a frequency range. For instance, the channel 1 is defined between a frequency $f_0$ and $f_1$.

The example frequency hopping of FIG. 3 may be associated with a frequency hopping sequence. This sequence may be transmitted to one or more nodes of a network that may utilize the channels 1-M. In some instances, the sequence is transmitted from a particular node in the network that will initiate the frequency hopping. The particular node may comprise, for example, a coordinator of the network, such as a PAN coordinator.

It should be appreciated that the frequency hopping process 300 illustrated in FIG. 3 is an exemplary process, and that the frequency hopping process 300 may be implemented in other manners and/or based on other hopping sequences. For example, although the frequency hopping of FIG. 3 utilizes a hopping sequence that hops the control channel 302 from channel 1 to channel 3, and then from channel 3 to channel M-1, a different hopping sequence may be utilized to hop the control channel 302 to any of the channels 1-M in any order.

In one implementation, a node wishing to broadcast data may perform a number of data broadcasts over a number of channel hops. For example, when the control channel 302 is defined at channel 1, the node may transmit a PTB message over the control channel 302 indicating that data will be broadcast on a particular data channel (e.g., any of channels 2-M). The node may then switch (e.g., tune) to the particular data channel and broadcast the data over the particular data channel.

Thereafter, the node may repeat the data broadcasting process when the control channel 302 is defined at channel 3. That is, when the control channel 302 is located at channel 3, the node may transmit another PTB message over the control channel 302 indicating that the same data will be broadcast on a particular data channel (e.g., any of channels 1, 2, or 4-M). The node may then switch (e.g., tune) to the particular data channel and broadcast the same data over the particular data channel. The data broadcasting process may be repeated any number of times specified by a layer, such as a MAC sub-layer or an upper layer of the node. Between each rebroadcast, the control channel 302 and/or data channel may be frequency hopped to different channels.

In some instances, this rebroadcasting process may allow the PTB message and/or data to be retransmitted on a different channel than that utilized in a previous transmission. In such instances, this may provide another opportunity for one or more neighboring nodes to receive a PTB message and/or data, which may not have been received due to, for example, interference on a channel utilized in the previous transmission.

Example Prepare-to-Broadcast Protocol Data Unit

Figure 4:
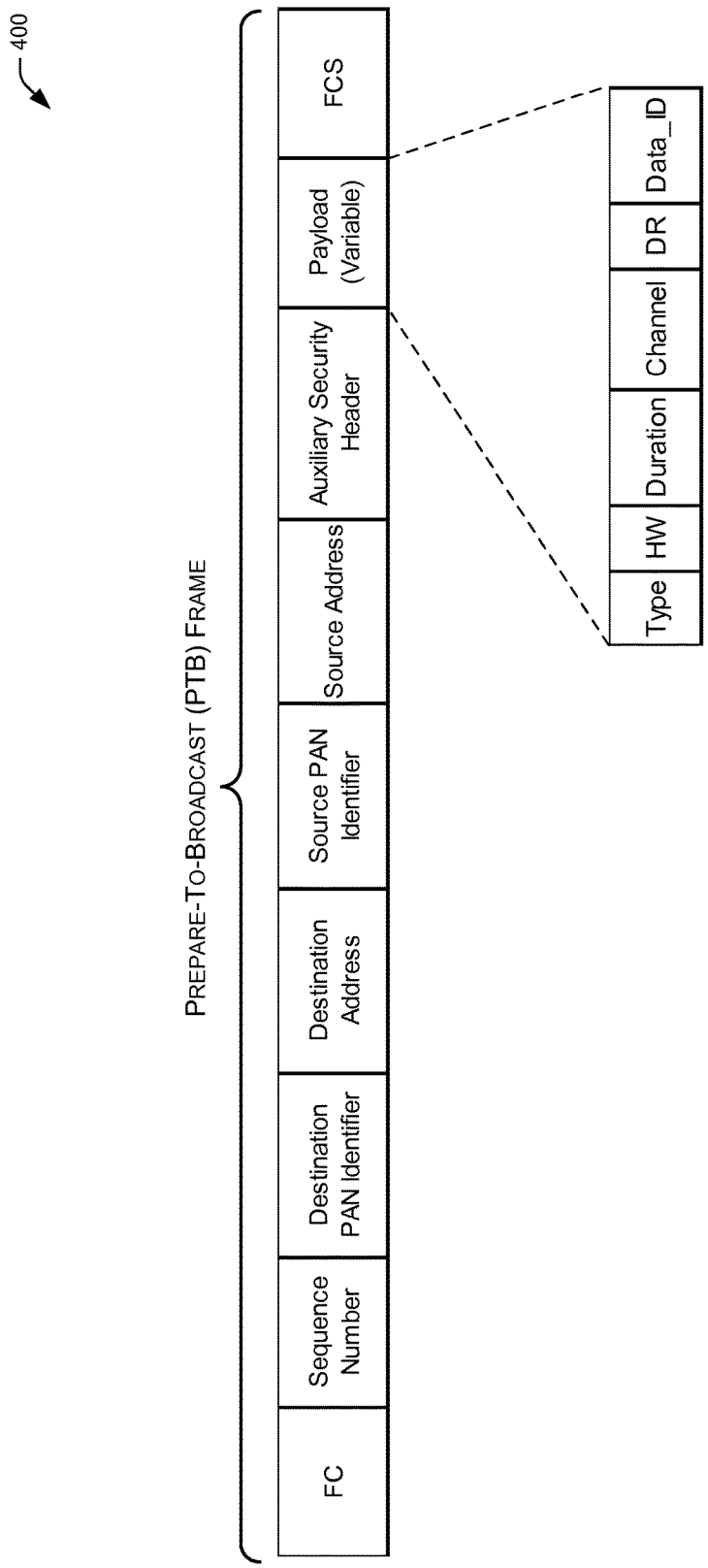
FIG. 4 illustrates an example prepare-to-broadcast protocol data unit which may be transmitted in a multi-channel network.

FIG. 4 illustrates an example prepare-to-broadcast (PTB) protocol data unit (PDU) 400 which may be transmitted in a multi-channel network. This frame example is based on the frame format described in the 802.15.4 standard. The term PDU is used herein to refer generally to any communication, message, or transmission within a communication network, such as that shown in FIG. 1. The term PDU is based, at least in concept, on the OSI Model and may comprise, for example, a bit, a frame, a packet, a segment, etc. In the example of FIG. 4, the prepare-to-broadcast PDU 400 is illustrated in the form of a frame.

In some instances, one or more layers of the OSI model may be utilized to transmit one or more PDUs between nodes. For example, the data link layer of the OSI model may be utilized to transmit a PDU between two or more of the nodes 102 in the architecture 100. In particular implementations, the MAC sub-layer of the data link layer may be utilized to transmit a PDU between two or more of the nodes 102. Further, in some implementations, an access method may be utilized to transfer PDUs, such as the carrier sense multiple access with collision avoidance (CSMA/CA) method.

As discussed above, the PTB frame 400 may be used to inform neighboring nodes that a node wishes to broadcast data. The PTB frame 400 will be described with reference to the example network of architecture 100 of FIG. 1. However, the example PTB frame 400 is not limited to use with the example architecture 100, and may be implemented using other architectures and devices.

As shown in FIG. 4, the PTB frame includes the following fields: frame control (FC), sequence number, destination personal area network (PAN) identifier, destination address, source PAN identifier, source address, auxiliary security header, payload, and frame check sequence (FCS). Details of the foregoing fields of the 802.15.4—based PTB frame other than the payload are well known to those skilled in the art and are not described in detail herein. The payload of the PTB frame, however, is customized to implement the broadcasting techniques described above, as well as other functionalities. The payload may be variable in size and may include, for example, one or more of the following fields:

Type: This field indicates a type of the frame, e.g., RTS, CTS, etc. In the example of FIG. 4, this field indicates that the frame is a PTB frame.

HW: This field indicates a modulation technique and/or data rate that are determined at a broadcasting node and that will be utilized to broadcast data.

Duration: This field indicates a total expected time for transmitting data frame(s) specified in the PTB frame. The duration may include time to transmit the specified data frames, waiting times such inter-frame spacing (IFS) (e.g., SIFS, DIFS, etc.) between frames, and acknowledgment (ACK) or non-acknowledgement (NACK) responses. The duration field may be used to determine a duration that a node will be busy communicating with another node and therefore unavailable to receive.

Channel: This field indicates a data channel that will be utilized to broadcast data.

Data Rate (DR) parameters: This field indicates a data rate to be utilized to broadcast data.

Data_ID: This field includes an ID of a data PDU (e.g., data packet) to be broadcast. This field may be utilized to, for example, determine if the data PDU to be broadcast has been previously received at a node receiving the PTB frame.

Example Processes

Figure 5:
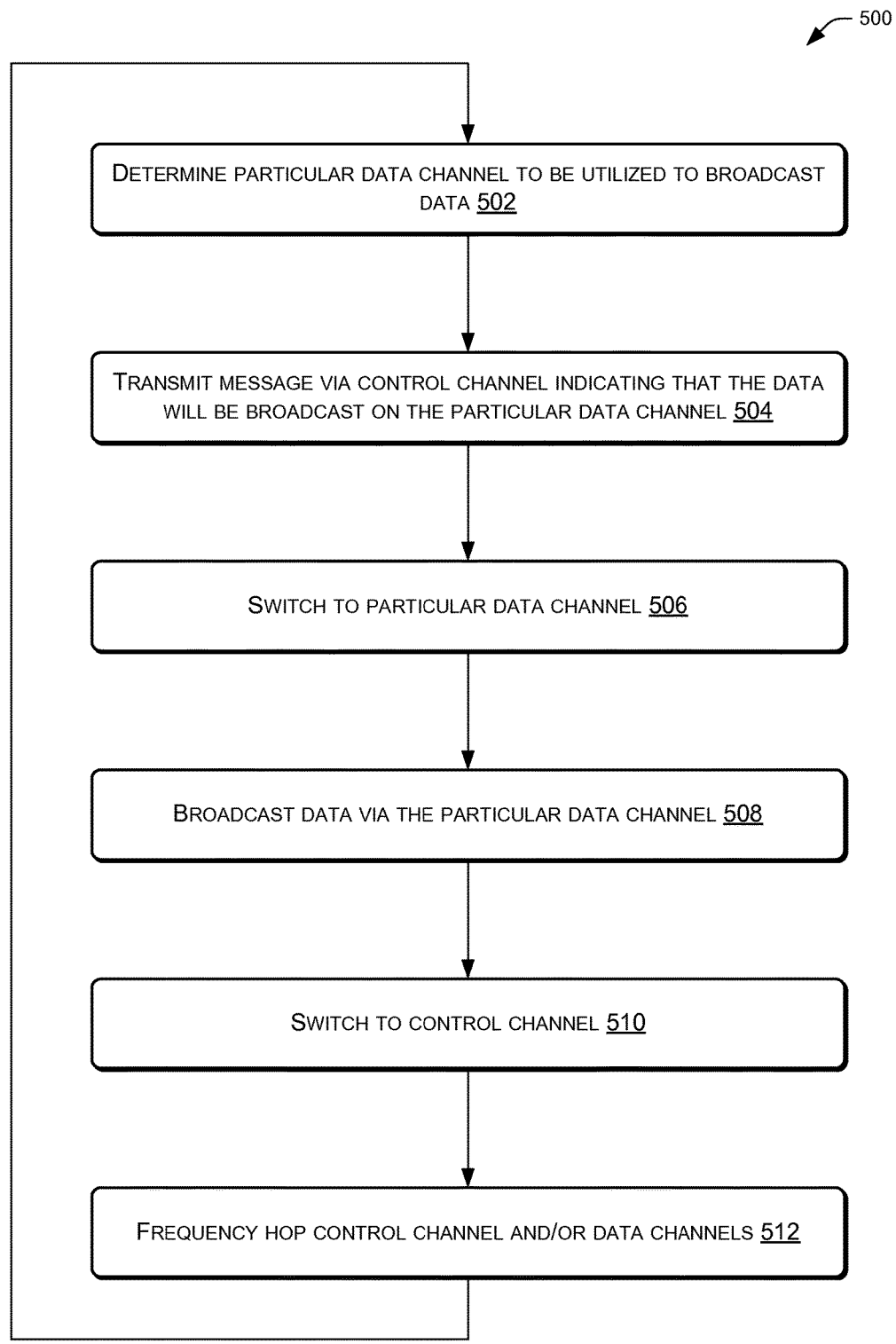
FIG. 5 illustrates an example process for transmitting a prepare-to-broadcast message over a control channel indicating that data will be broadcast on a particular data channel, switching to the particular data channel, and broadcasting the data over the particular data channel.
Figure 6:
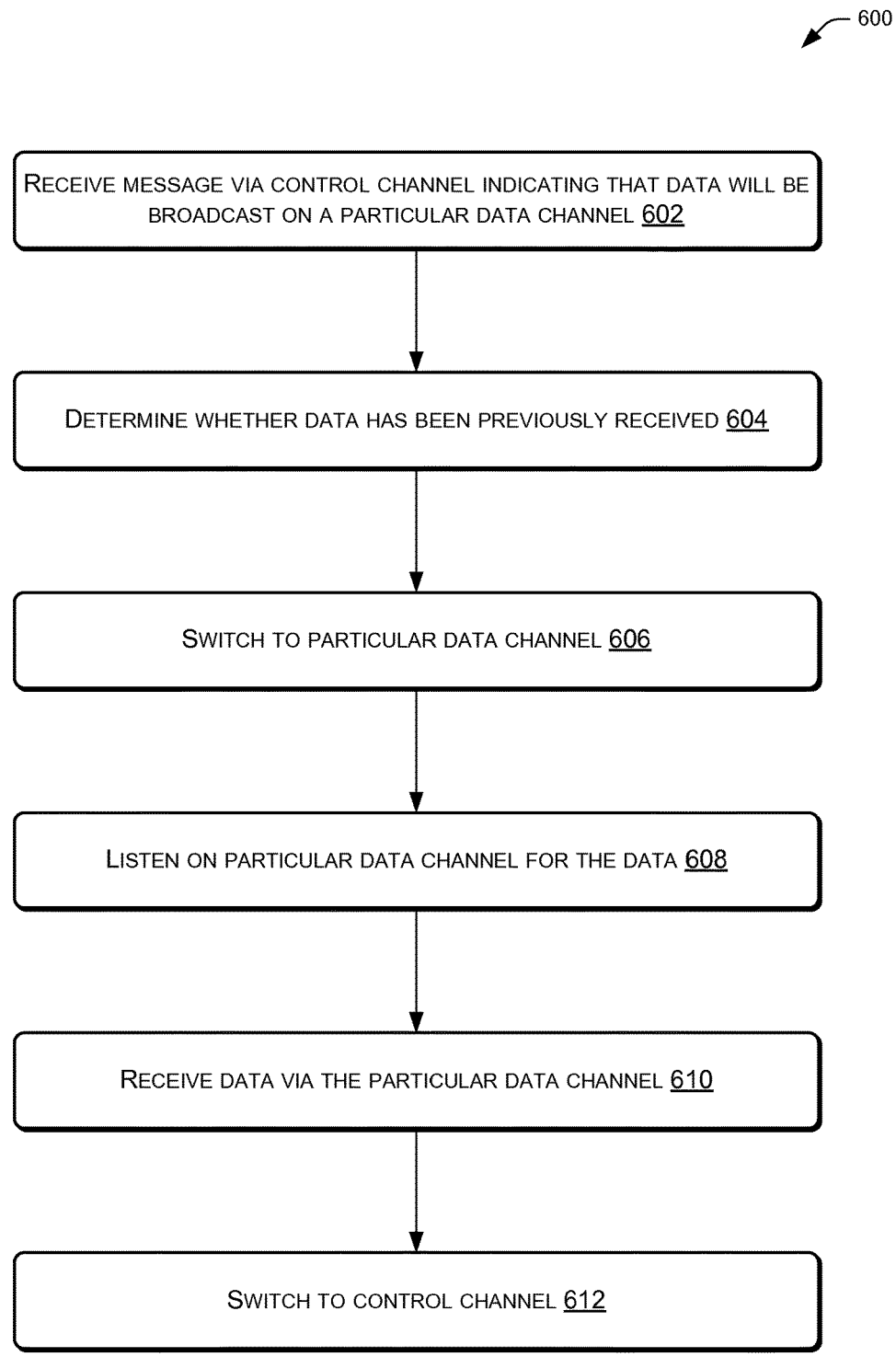
FIG. 6 illustrates an example process for receiving a prepare-to-broadcast message over a control channel indicating data will be broadcast on a particular data channel, switching to the particular data channel, and receiving the data over the particular data channel.

FIGS. 5-6 illustrate example processes 500 and 600 of transmitting or receiving a PTB message over a control channel indicating that data will be broadcast on a particular data channel and broadcasting or receiving the data over the particular data channel. In FIG. 5, the process 500 may be performed by a node that will transmit a PTB message and/or data. While in FIG. 6, the process 600 may be performed by a node that will receive the PTB message and/or data. However it should be understood that every node can function as both a broadcasting node and a receiving node as needed.

The processes 500 and 600 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In FIG. 5, the process 500 is performed by a node that will broadcast data. At operation 502, a broadcasting node determines a particular data channel for broadcasting data. At 502, the broadcasting node may also determine a modulation technique and/or a data rate for broadcasting the data. Referring to the example of FIG. 1, the channel determination module 124 may perform the operation 502.

At operation 504, the broadcasting node transmits a message over a control channel indicating that the data will be broadcast on the particular data channel. The message may comprise a PTB message and may indicate the determined modulation technique and/or data rate to be utilized to broadcast the data. Referring to the example of FIG. 1, the communication module 128 may perform the operation 504.

At operation 506, the broadcasting node switches (e.g., tunes) to the particular data channel determined in the operation 502. Referring to the example of FIG. 1, the communication module 126 may perform the operation 506. At operation 508, the broadcasting node broadcasts the data over the particular data channel. The data may be broadcast based at least in part on the modulation technique and/or data rate determined in the operation 502. Referring to the example of FIG. 1, the communication module 126 may perform the operation 508.

At operation 510, the broadcasting node switches to the control channel by tuning a radio of the broadcasting node. The operation 510 may be performed after the data has been broadcast over the particular data channel. Referring to the example of FIG. 1, the communication module 126 may perform the operation 510.

At operation 512, the control channel and/or data channels are frequency hopped, i.e., their frequency ranges are redefined at periodic intervals. Although the process 500 includes performing the operation 512, in some instances the operation 512 is not performed. Referring again to the example of FIG. 1, the frequency hopping module 128 may perform the operation 512.

After the broadcasting node has sequentially tuned ("hopped between") the control channel and/or data channels, the broadcasting node may return to the operation 502 and perform the operations 502-512 again (e.g., retransmit PTB message and/or data). Here, the operations 502-512 may utilize, in part, the hopped control channel and/or hopped data channels. The operations 502-512 may be performed a number of times.

Meanwhile, in FIG. 6, the process 600 is performed by a node that may receive data that is broadcast. At operation 602, a receiving node receives a message over a control channel indicating that the data will be broadcast on a particular data channel. The message may comprise a PTB message and may indicate a modulation technique and/or data rate to be utilized to broadcast the data. Referring to the example of FIG. 1, the communication module 126 may perform the operation 602.

At operation 604, the receiving node determines whether the data has been previously received. The receiving node may utilize a data ID included in the PTB message to determine whether the data has been previously received. For example, the determination may be based on a comparison of the data ID in the PTB message with data IDs associated with previously received data (e.g., data packets). Referring again to the example of FIG. 1, the data determination module 130 may perform the operation 604 and determine if the data was previously received.

In some instances, when the data has not been previously received, the receiving node proceeds to operations 606, 608, and/or 610. At operation 606, the receiving node switches to the particular data channel by tuning a radio of the receiving node. At operation 608, the receiving node listens on the particular data channel for the data. At operation 610, the receiving node receives the data over the particular data channel. Referring to the example of FIG. 1, the communication module 126 may perform the operations 606, 608, and/or 610.

At operation 612, the receiving node switches to the control channel. In some instances, the operation 612 may be performed after the data has been received. In other instances, the operation 612 may be performed after a predetermined time period has expired since switching to the particular data channel. Here, the operation 610 may not be performed. Referring to the example of FIG. 1, the communication module 126 may perform the operation 612.

Conclusion

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method of broadcasting consumption data from a network device, the method comprising:
   determining a particular data channel, from a plurality of data channels, for broadcasting consumption data, the consumption data associated with consumption of at least one of electricity, water, or gas;
   determining modulation techniques that are commonly available to a plurality of nodes located within a predetermined proximity to the network device, the plurality of nodes belonging to a heterogeneous network of nodes capable of communicating with the network device but having differing sets of modulation techniques available to use;
   determining a modulation technique of the determined commonly available modulation techniques to utilize for broadcasting the consumption data, the determined modulation technique providing a longest communication range from among the determined commonly available modulation techniques;
   broadcasting a prepare-to-broadcast message via a control channel, the prepare-to-broadcast message indicating that the consumption data will be broadcast on the particular data channel and using the determined modulation technique;
   switching to the particular data channel;
   broadcasting the consumption data via the particular data channel and the determined modulation technique without having received a communication from a neighboring node that indicates an availability of the neighboring node to receive the consumption data; and
   switching to the control channel after the consumption data has been broadcast.

2. The method of claim 1, wherein:
   the broadcasting the consumption data includes broadcasting the consumption data to the plurality of nodes; and
   the switching to the control channel includes switching to the control channel without receiving an acknowledgement message from any of the plurality of nodes.

3. The method of claim 1, wherein the particular data channel is determined by a media access control layer.

4. The method of claim 1, wherein:
   the control channel is located on a first channel of a multi-channel network when the prepare-to-broadcast message is broadcast via the control channel; and
   the method further comprises:
      frequency hopping the control channel from the first channel to a second channel of the multi-channel network; and
      rebroadcasting the prepare-to-broadcast message via the control channel which is located on the second channel.

5. One or more non-transitory computer-readable media storing executable instructions that, when executed by one or more processors of a network device, cause the one or more processors to:

determine a particular data channel, from a plurality of data channels, for broadcasting consumption data, the consumption data associated with consumption of at least one of electricity, water, or gas;

determine modulation techniques that are commonly available to a plurality of nodes located within a predetermined proximity to the network device, the plurality of nodes belonging to a heterogeneous network of nodes capable of communicating with the network device but having differing sets of modulation techniques available to use;

determine a modulation technique of the determined commonly available modulation techniques to utilize for broadcasting the consumption data, the determined modulation technique providing a longest communication range from among the determined commonly available modulation techniques;

broadcast a prepare-to-broadcast message via a control channel, the prepare-to-broadcast message indicating that the consumption data will be broadcast on the particular data channel and using the determined modulation technique;

switch to the particular data channel;

broadcast the consumption data via the particular data channel and the determined modulation technique without having received a communication from a neighboring node that indicates an availability of the neighboring node to receive the consumption data; and switch to the control channel after the consumption data has been broadcast.

6. A method comprising:

receiving a message from a neighboring node via a control channel, the message indicating that consumption data will be broadcast via a particular data channel of a plurality of data channels and via a modulation technique determined by the neighboring node, wherein the determined modulation technique is one of a plurality of modulation techniques that are determined to be commonly available to a plurality of nodes located within a predetermined proximity to the neighboring node, the plurality of nodes belonging to a heterogeneous network of nodes capable of communicating with the neighboring node but having differing sets of modulation techniques available to use, wherein the determined modulation technique is further determined to provide a longest communication range from among the determined commonly available modulation techniques, and wherein the consumption data is associated with consumption of at least one of electricity, water, or gas;

without sending a communication to the neighboring node indicating an availability to receive the consumption data:

switching to the particular data channel; and listening for a broadcast of the consumption data from the neighboring node via the particular data channel; and switching to the control channel after the consumption data has been received or a predetermined time period has expired.

7. The method of claim 6, wherein the listening for the broadcast of the consumption data includes listening for a broadcast of the consumption data after a predetermined time interval has expired since the message was received via the control channel, the predetermined time interval comprising a short inter-frame space.

8. The method of claim 6, further comprising:

determining that the consumption data has not been previously received;

wherein the switching to the particular data channel is performed in response to determining that the consumption data has not been previously received.

9. The method of claim 6, further comprising:

receiving the consumption data via the particular data channel after switching to the particular data channel;

wherein the switching to the control channel includes switching to the control channel after receiving the consumption data via the particular data channel.

10. The method of claim 6, wherein the message indicates a data rate at which the consumption data will be broadcast.

11. The method of claim 6, wherein the consumption data includes a greater number of bits or bytes than the message.

12. One or more non-transitory computer-readable media storing executable instructions that, when executed by one or more processors, cause the one or more processors to:

receive a message from a neighboring node via a control channel, the message indicating that consumption data will be broadcast via a particular data channel of a plurality of data channels and via a modulation technique determined by the neighboring node, wherein the determined modulation technique is one of a plurality of modulation techniques that are determined to be commonly available to a plurality of nodes located within a predetermined proximity to the neighboring node, the plurality of nodes belonging to a heterogeneous network of nodes capable of communicating with the neighboring node but having differing sets of modulation techniques available to use, wherein the determined modulation technique is further determined to provide a longest communication range from among the determined commonly available modulation techniques, and wherein the consumption data is associated with consumption of at least one of electricity, water, or gas;

without sending a communication to the neighboring node indicating an availability to receive the consumption data:

switch to the particular data channel; and listen for a broadcast of the consumption data from the neighboring node via the particular data channel; and switch to the control channel after the consumption data has been received or a predetermined time period has expired.

13. A network computing device comprising:

one or more processors;

memory communicatively coupled to the one or more processors; and one or more modules stored in the memory and executable by the one or more processors to perform acts including:

identifying a particular data channel from a plurality of data channels for broadcasting consumption data, the consumption data associated with consumption of at least one of electricity, water, or gas;

determining modulation techniques that are commonly available to a plurality of nodes located within a predetermined proximity to the network computing device, the plurality of nodes belonging to a heterogeneous network of nodes capable of communicating with the network computing device but having differing sets of modulation techniques available to use;

determining a modulation technique of the determined commonly available modulation techniques to utilize for broadcasting the consumption data, the determined modulation technique providing a longest communication range from among the determined commonly available modulation techniques;

transmitting a message indicating that the consumption data will be broadcast via the particular data channel of the plurality of data channels and the determined modulation technique; and broadcasting the consumption data via the particular data channel and the determined modulation technique without having received a communication from a neighboring node that indicates an availability of the neighboring node to receive the consumption data.

14. The network computing device of claim 13, wherein the acts further include:

confirming that a number of bits or bytes of the consumption data is greater than a number of bits or bytes of the message;

wherein the message is transmitted in response to confirming that the number of bits or bytes of the consumption data is greater than the number of bits or bytes of the message.

15. The network computing device of claim 13, wherein the communication from the neighboring node comprises a clear-to-send message.

16. The network computing device of claim 13, wherein the acts further include:

retransmitting the message via the control channel a predetermined number of times; and rebroadcasting the consumption data via the particular data channel after each retransmission of the message.

17. The network computing device of claim 13, wherein the acts further include:

redefining the control channel from a first channel, where the control channel is located when broadcasting the consumption data, to a second channel; and retransmitting the message via the control channel when the control channel is redefined to the second channel.

18. The network computing device of claim 13, further comprising:

a metrology module stored in the memory and executable by the one or more processors to collect the consumption data for broadcasting.

19. The network computing device of claim 13, wherein the network computing device comprises at least one of a utility meter, a control device, a sensor, a transformer, a router, a server, a relay, a switch, or a valve.

20. The network computing device of claim 13, wherein the determining the modulation technique includes determining the modulation technique that requires less communication time from among the plurality of modulation techniques that are commonly available to the plurality of nodes located within the predetermined proximity to the network computing device.

* * * * *